April 5, 1949. C. D. MULLINIX Re. 23,096

MOISTUREPROOF PACKAGE

Original Filed July 19, 1943 4 Sheets-Sheet 1

CHARLES D. MULLINIX,
INVENTOR

BY Lodbert A. Huebner
ATTORNEY.

MOISTUREPROOF PACKAGE

Original Filed July 19, 1943 4 Sheets-Sheet 2

CHARLES D. MULLINIX,
INVENTOR

BY Herbert A. Huebner
ATTORNEY.

April 5, 1949. C. D. MULLINIX Re. 23,096

MOISTUREPROOF PACKAGE

Original Filed July 19, 1943 4 Sheets-Sheet 3

CHARLES D. MULLINIX,
INVENTOR.

BY Herbert A. Huebner
ATTORNEY.

MOISTUREPROOF PACKAGE

Original Filed July 19, 1943 4 Sheets-Sheet 4

CHARLES D. MULLINIX,
INVENTOR.

BY Lambert Abtuebner
ATTORNEY.

Reissued Apr. 5, 1949 Re. 23,096

UNITED STATES PATENT OFFICE 23,096

MOISTUREPROOF PACKAGE

Charles D. Mullinix, Los Angeles, Calif.

Original No. 2,335,019, dated November 23, 1943, Serial No. 495,270, July 19, 1943. Application for reissue November 22, 1944, Serial No. 566,330

12 Claims. (Cl. 229—87)

This invention in its broad aspects relates to improvements in means for packaging articles especially food products such as butter, oleomargarine, cereal food products, bacon, and the like, and the method of making up the package and applying it to the food product or other article packaged therein.

While my invention is applicable to the packaging of all kinds of articles, as indicated, its advantages are so fully realized in the packaging of butter, oleomargarine, bacon and the like that for purpose of illustration I shall refer primarily to the packaging of such foods.

Dealing first with butter, moisture evaporation is a serious factor in the storage and shipping of butter. Evaporation results not only in loss of weight, but in the formation of unsightly and undesirable salt crystals on the surface of the butter, and a disturbance of the natural butter constituents and consequent impairment of flavor and quality.

It has been customary to store butter in tubs until ready for shipment and sale, because the moisture evaporation is less when the butter is retained in large bulk. For shipping and marketing the butter is cut into prints usually quarter pounds or one pound, and in the case of quarter pound prints four prints are usually assembled to make up a package. There is an Elgin style (square cross section) package generally used in the midwest, and in the east, and what is known as the Western flat style is generally used in the west. My drawings (Figures 1 to 6) illustrate a Western flat package. These designations are by way of example only for purposes of reference.

In each case the print is wrapped usually in vegetable parchment paper, and the print or prints so wrapped are packaged in a waxed carton, or in case a double wrapped package is desired, a dry waxed sulphite sheet is wrapped about the print or prints previously wrapped in parchment paper and the whole then packaged in the carton. The cartons are usually of board stock produced on what is known as a cylinder machine, and in producing such board stock fillers are used which sometimes contain contaminating substances. Such cartons are not sealed against escape of moisture, nor intrusion of air, dirt and other foreign substances, including odors, and in fact have a tendency to gap open at the flaps.

Vegetable parchment paper is permeable by moisture although it has high wet strength. Dry waxed sulphite double wrap is insufficient to prevent evaporation of moisture and the like from the butter prints even when used with the vegetable parchment initial wrap and inside of the waxed board carton.

It has been found that the means and method of packaging as described above is relatively expensive and at the same time unsatisfactory in many important respects. Furthermore, printing on board is ordinarily dull when compared with printing on other types of stock, as for example sulphite, and the cost of manufacturing board cartons is considerably more than packages made according to my invention to be described.

The moisture content of butter is estimated to be about twenty per cent. Evaporation losses in weight of butter newly churned are most excessive during the first five or ten days. Consequently newly churned butter heretofore must be either immediately packaged and sold or tubbed for storage, if it is to be marketed with approximately its original moisture content. The economic difficulties of immediate sale, and the double handling when the butter is tubbed and subsequently packaged are problems to be overcome by my invention. Moreover the double handling increases possibilities of contamination and possible deleterious effect on flavor and quality.

Since butter is greasy, is easily contaminated by dirt, dust and the like, is influenced by heat and cold, a proper solution of the packaging problem is the primary object of my invention.

In regard to butter substitutes, such as oleomargarine and the like, not only is the product per se cheaper and less able to sustain the added load of expensive packaging, but the product itself and the packaging and dispensing of it is generally subject to many legal restrictions and regulations.

Both butter and oleomargarine are usually overweighed when packed to allow for shrinkage losses when packaged in accordance with the prior art method and means, and there is thus a substantial item of money loss to the producer.

More detailed objects of my invention are to provide a package and method of making it which will:

1. Prevent evaporation and moisture losses;
2. Prevent contamination by dust, dirt and foreign substances, such as foreign odors;
3. Reduce packaging costs;
4. Provide a more attractive, more practical and more useful package;
5. Simplify methods of producing the package and introducing the articles to be packaged therein;
6. Reduce the weight of the package and generally simplify the same without loss of utility; and
7. Adapt the package to production on machines now existing with but minor modification.

Many of the foregoing subjects are applicable to the modified form of package (Figures 7 to 11)

intended primarily for bacon or other meats. Bacon is presently wrapped either in cellophane sheets, or in soft grease-proof paper sometimes enclosed in board cartons. The cellophane or waxed paper gives no support as a package, and the board cartons are subject to the same deficiencies as in the case of packaging butter.

The essence of my invention, as brought out in this specification, is particularly useful in packaging bacon. The same type of laminated blank is employed, and the completed package has the same general characteristics, but because of the nature of bacon (it has a solvent effect on the paraffine and renders my package substantially self sealing), I find that a modified form of folding is advantageously employed.

Other objects and advantages of my invention will become apparent from a further consideration of the description and claims which follow.

Figure 1:
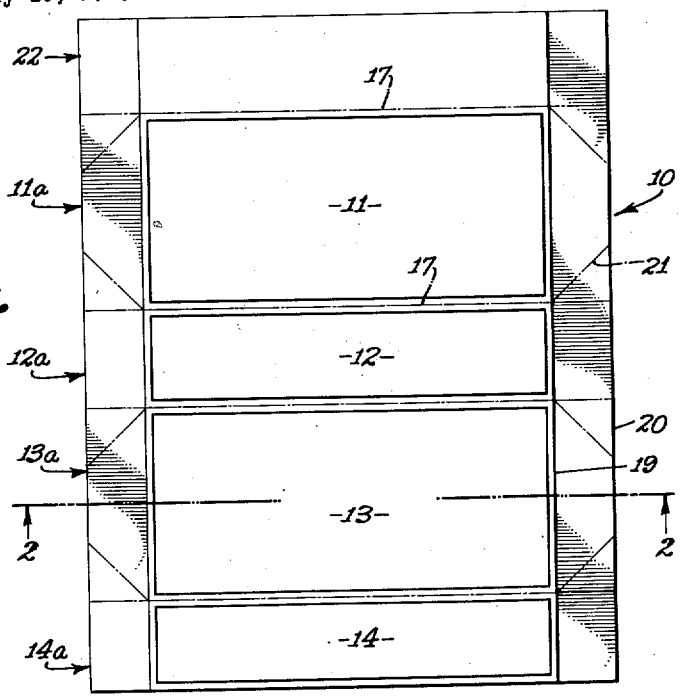
Figure 1 is a top plan view of a package blank embodying the features of my invention.
Figure 2:
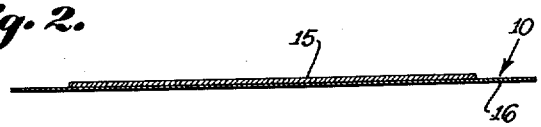
Figure 2 is a cross-section taken on the line 2—2 of Figure 1.

Referring to the form of the invention shown in Figures 1 to 6:

In the drawings I have omitted illustration of the contents of the package in order to clarify the illustration of the package itself. It is to be understood that in the packaging of butter, oleomargarine and other articles or products having the approximate form of the finished package, the article will be inserted therein as the package is in the process of formation prior to the condition shown in Figure 3, according to the preferred method of forming and utilizing the package, although it may be prepared on an aluminum or other type of form leaving one end only open for filling as for example in the case of cereals, and such open ends may be subsequently closed by a vacuum method of a character generally understood in the art.

The package is made of laminated paper blanks having at least two layers, bonded by paraffine and latex or other moisture-proofing substance. The blanks are most efficiently manufactured from previously prepared rolls of the required finished width, simultaneously fed from the rolls in continuous webs or strips. While more than two layers may be employed, I find the use of two adequate, and will refer to only two in outlining the steps of the process.

The blank 10 illustrated in Figure 1 is made in the following manner: paper, preferably sulphite stock of different thicknesses and widths, undergoes a continuous process involving the following steps:

1. Labels or other indicia are printed in the areas designated by the rectangles 11, 12, 13 and 14, on the paper which is to comprise the outer layer of the lamination. This printing is preferably done with aniline or any quick drying ink of a character to be set by wax. In the form chosen for illustration the outer layer 15 is relatively heavy and the inner layer 16 is relative light stock.

2. The two sheets of paper are immersed in a heated mixture of paraffine and latex or other moisture proofing bonding substance.

3. The wax paper in correct lateral registration is passed between rolls which compress the two sheets together.

4. Upon leaving the pressure rolls the laminated material is immersed in an icewater bath to set the wax and latex.

5. The laminated web is vacuum dried.

6. Transverse lines 17 which define the top and bottom corners 18 of the completed package are scored.

7. The web is cut in lengths to form the blank.

Each blank thus comprises a rectangular laminated sheet of relatively thick heavy paper of lesser width and relatively thin light paper of greater width as illustrated, the laminations being bonded by a moisture proof material which impregnates the paper at the same time that it furnishes a bond between the laminations. This treatment also imparts body and stiffness to the blank, enabling the use of lighter paper for the heavy layer 15 than can be used satisfactorily for board cartons.

The margin of the heavy paper 15 is indicated at 19, and the margin of the light paper 16 is indicated at 20. Certain fold lines are shown in Figure 1 by reference numeral 21, but these are for illustrative purposes only and according to my preferred method of producing the blank are not scored thereon.

I may produce the blanks in a manner to utilize the heavier layer on the outside, as illustrated; but for packaging some products the position of the heavier and lighter layers may be reversed. In packaging butter the illustrated form is ordinarily used.

Assuming these blanks are to be used for packaging butter or any other product preformed into a single print the full size of the package or into a plurality of prints assembled into the same total size, the packaging is performed in substantially the following manner:

(1) The blanks being contained in any suitable magazine, butter is introduced against the center panel 12a, and panels 11a and 13a representing the top and bottom of the finished package are folded over, machines for this purpose being known to the art. Of course the same operation may be performed by hand. It is to be understood that I utilize a true method in the sense that the various steps now being described may be done manually, but that in practice it is preferable to utilize machines for the purpose.

(2) Side edge 22 is folded along the scored line and sufficient heat is applied to soften the paraffine and latex on the outer surface thereof.

(3) Overlapping edge 14a is then folded up and pressed into contact with edge 22, cold being applied to set the bond of paraffine and latex between the contacting surfaces of the two edges.

Figure 3:
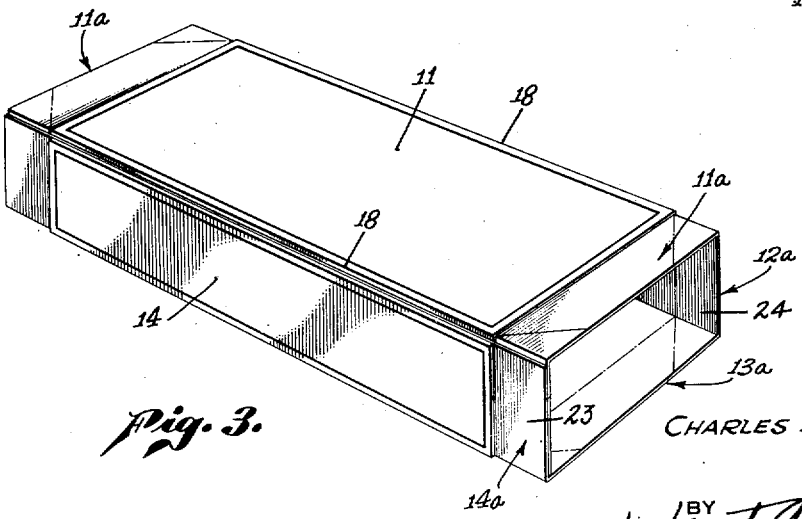
Figure 3 is a perspective view illustrating my package as partly formed.
Figure 4:
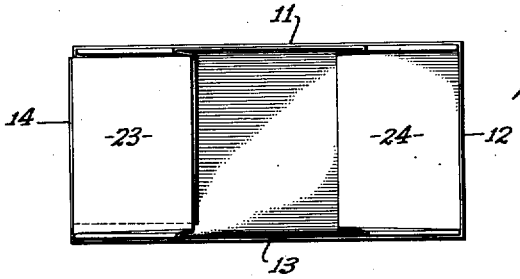
Figure 4 is an end view of the package shown in Figure 3 in a further state of completion.
Figure 5:
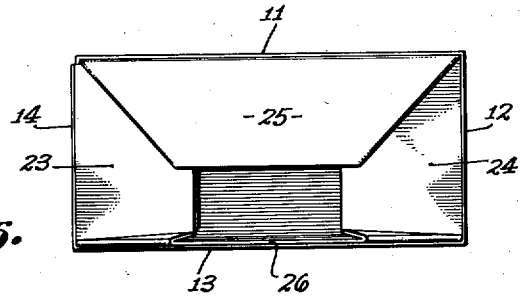
Figure 5 is an end view similar to Figure 4 illustrating an additional step in the fabrication of my package.
Figure 6:
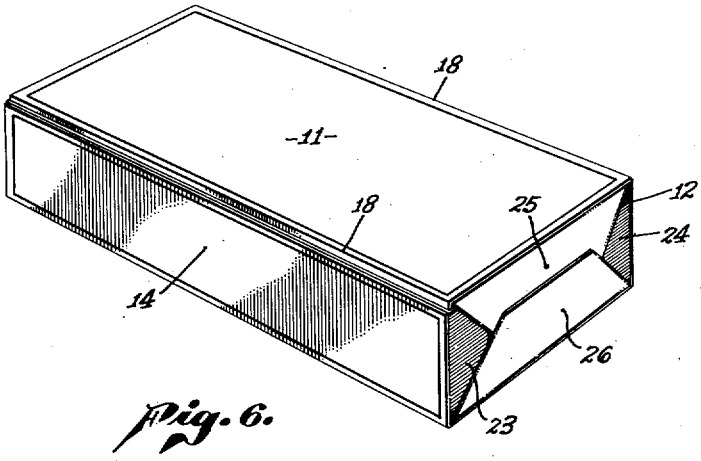
Figure 6 is a perspective view showing the package completed.

The package at this stage has the appearance illustrated in Figure 3.

(4) The side portions 23 and 24 of the ends are folded in preferably by use of a hot finger which softens the paraffine and latex on the outer surface.

(5) The top end flaps 25 are folded down and heat is simultaneously applied to soften the paraffine and latex on the outer surface.

(6) The bottom end flaps 26 are folded up and brought into contact with the flaps 25. A cold plate may be used for this purpose.

In heating the paraffine and latex where the various folding is performed, it is preferable to utilize hot fingers or plungers which soften the paraffine and latex as the folding is taking place, so that no prolonged heat is introduced to the butter or other contents of the package.

This is important, because heat applied to butter will discolor and otherwise injure it.

The edges 19 of the heavy layer 15 represent the end margins of the package, the end folding of the lighter layer 16 taking place along such margins. The fold lines 21 indicated in Figure 1 may of course be scored on the blanks, but this is not necessary, and the folding of the ends is readily accomplished in the manner described.

If the package is to contain cereal or other material or articles not preformed into prints naturally filling the package, it may be formed in the manner described to the extent applicable on an aluminum block or other type of form, leaving one end open, and after filling, the open end may be folded and sealed by the application of heat and preferably a vacuum plate of a type known to the art whereby a flap end closure is accomplished.

Packages of this general character are ordinarily stacked bottom upon top or on their side edges, not upon their ends. Therefore it is important that the top, bottom and sides of the package embody a firmness and protective rigidity which is not necessary at the end. I have thus used this fact to achieve a package which offers adequate firmness and protective rigidity over all surfaces where that quality is necessary, and by eliminating heavier layers at the end, where it is not needed, I am enabled to perform compound folding and sealing operations described which would be quite difficult and unsatisfactory if the heavy layer of the laminated blank extended the full width thereof.

My package is completely sealed against dirt and other foreign substances, is grease resistant, and is moisture proof to the extent necessary to retain butter, oleomargarine, or other food products with substantially their original moisture content and in a condition generally realized in canning processes. While in the preferred example of my invention I use a mixture of paraffine and latex to impregnate the paper and form the bond between the laminations as well as the final sealing of the package, the latex may be eliminated, and the paraffine alone used, or I may substitute some other form of moisture proof sealing bond. It should have adhesive qualities, and preferably coat the surface of the sheet material as well as impregnate the same. It should render the blank substantially impervious to air and moisture and resistant to grease. In any event I am enabled to produce in a single packaging operation, a completely sealed package having the necessary protective qualities, of improved appearance, and the ability to retain its shape and original sealing qualities indefinitely.

I do not limit myself to the use of sulphite stock, as my method may be employed with other types of stock, but as sulphite stock may be manufactured cheaper than board and is adequate for ordinary purposes, my invention is responsible for the attendant saving. The nearest approach to a sealed carton or package of this general character, within my knowledge, is the combination of a board carton made in the conventional manner, and as a second operation enclosed with waxed paper. This involves a considerable number of manufacturing operations not required in my invention, and is unsatisfactory in various other respects. As before stated, packaging according to my invention may be accomplished manually, but is preferably done by machine, only slight modifications of available machinery being necessary to perform the several steps described.

My package is impervious to air in the generally accepted meaning with reference to treated paper containers. It is not absolutely airtight, but is substantially so, and the term is to be so construed when used in the claims.

Carton board is made on cylinder machines of which there are but a relatively small number in existence, and these are in tremendous demand at the present time due to the need for carton board in connection with national defense industries. There is no present shortage, however, in Fourdrinier machines, which are capable of making .009 solid stock. This weight is too light to use alone for food cartons, but is adequate as the heavy lamination in my improved package.

The usual minimum weight of carton board used in food packages is .016, and my laminated blank in a combined weight not over .012 has firmness and rigidity equal to that of the .016 carton board.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

For instance the inner layer may be made of greaseproof or vegetable parchment paper applicable especially to the packaging of oleomargarine and eliminating the conventional parchment inner wrap such as is used with the old style carton containing oleomargine.

While, for convenience in description, I have specifically mentioned paper stocks as comprising the laminations of my blank, it is within the scope of my invention to utilize other sheet material having the general protective and manipulative characteristics ascribed to paper stocks. Such materials are known which are inherently heat sealing, and may be bonded to a second lamination without the preliminary bonding bath described for paper, by pressing under heated rolls. Other cellulose materials, such, for example, as cellophane, can be subjected to the same treatment as described for paper.

If desired, a window package may be made in using a transparent light lamination, and cutting out an area in a panel or panels of the heavy lamination.

In the modified form of package shown in Figures 7 to 11, I may employ a laminated blank 50 comprising at least one light sheet 51 and at least one heavy sheet 52, using materials and a laminating method as already described.

For bacon, and other meat products, the light sheet is preferably on the inside of the completed package, but this is optional.

Scoring 53, 54, 55 and 56 through the multiple thickness section provides rectangular areas 57, 58 and 59 defined by the scoring and the edges 60 and 61 of the heavy sheet, upon which labeling and advertising indicia may be printed on the surface which is to be the outside of the package. It is immaterial whether the score lines extend into the marginal portions of the light sheet.

The score lines in pairs 53 and 54, and 55 and 56, are individually spaced leaving rectangular areas 62 and 63 which will form the side walls of the package.

Figure 9:
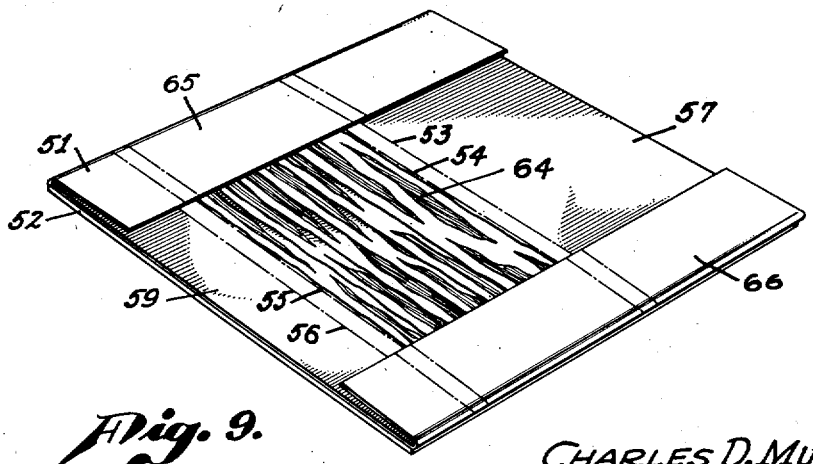
Figure 9 is a perspective view illustrating my modified package as partly formed.

In handling the blank to form the package, the product (for example, bacon 64) is laid on the open blank within the boundaries of the area 58. The marginal extensions 65 and 66 of the light sheet only are folded in as shown in Figure 9 to close the ends of the package. While the sheet material employed should be grease resistant, the grease in the bacon has some solvent effect on the paraffine in the blank and tends to soften the surface enough to cause the material to cling to the bacon; moreover, as bacon is sticky, it tends to cling to the surface of any paper or cellulose material, especially if the surface is smooth, and thus effect an adhesion between the bacon and the material of the package.

Figure 10:
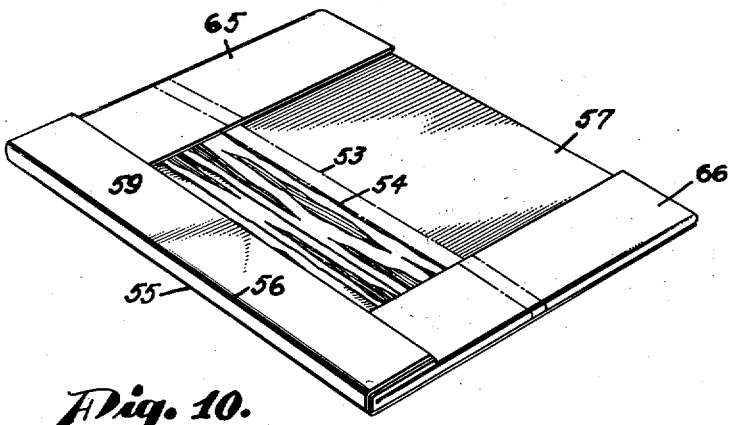
Figure 10 is a perspective view of the package shown in Figure 9 in a further state of completion.

The next step is to fold over the area 59, along the scoring 55 and 56, as shown in Figure 10.

Figure 11:
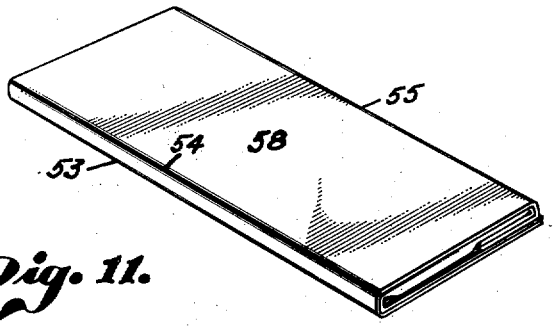
Figure 11 is a perspective view showing the modified package completed.

The final step is to fold the partly completed package over so that the area 58 is uppermost and the area 57 is lowermost, as shown in Figure 11. This particular manner of completing the package is not essential, as the flap which includes the area 57 may be used as the top of the package, but in doing it as first described the weight of the bacon is utilized in closing the package. The package in conjunction with the bacon is self-sealing, in any event. Heat may be applied to seal, if desired, but with a product such as bacon which imparts the solvent action or has the adhesive qualities referred to, the heat sealing is not necessary. The solvent action is mild, and affects only the inner surface region of the package. Such packages having flat tops, bottoms and sides, will stack conveniently, and even after being opened can be reclosed and will maintain their shape.

Figure 7:
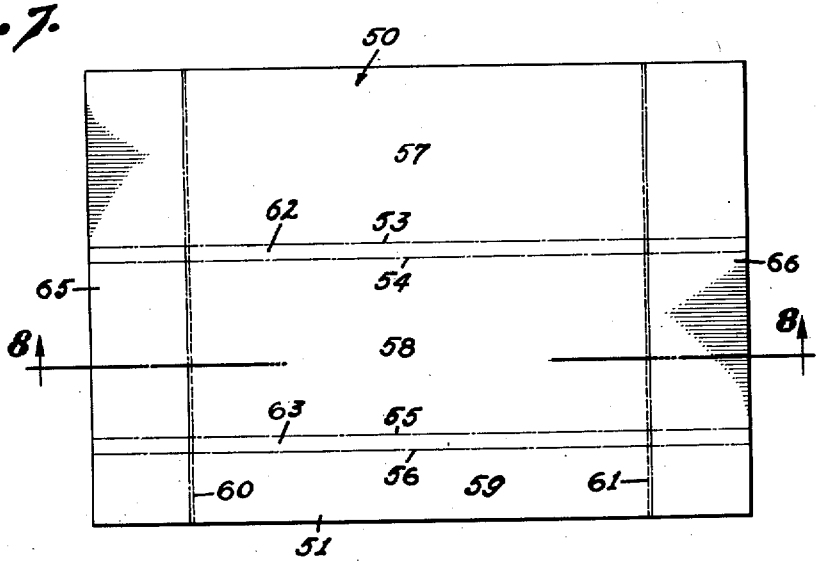
Figure 7 is a top plan view of a modified form of package blank embodying the features of my invention.
Figure 8:
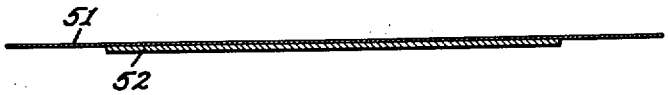
Figure 8 is a cross-section taken on the line 8—8 of Figure 7.

Paper and other cellulosic sheet material, such as cellophane, contemplated as suitable for practising my invention, are always manufactured with a grain and always formed into rolls with the grain running lengthwise of the web as delivered from the roll. This is standard and universal in the art, and is well known. Such material will bend, curl or crease more readily with the grain than across it. This is also well known. I take advantage of this phenomena by laminating the sheets with the grain running in the same direction in both sheets and with such grain running lengthwise of the cut blanks, that is to say from one cut end to the other. The scoring, on the plural layer section at least, is parallel to the ends of the blank and therefore at right angles to the grain of the material. Thus, when the score lines are used as corners when forming the package, the direction of the grain is substantially parallel to a plane representing the vertical cross section of the package, thereby attaining the maximum vertical and transverse rigidity, or in other words resistance against deformation from pressure on the top or sides of the package. The same structural advantage is realized in a package which is formed from a blank as illustrated in Figure 1 but with a greater number of score lines 17, as for example eight score lines by which a package with an octagon cross section can be formed, or as illustrated in Figure 7 but with only two score lines instead of the respective pairs 53—54 and 55—56. Employing two wide score lines would result probably in a package of substantially rectangular cross section but if the lines were narrow the package might have a somewhat elliptical cross section. If a blank is used which has no scoring at all, to form a package which is oval or circular in cross section, corresponding in shape to the "Country roll" of butter, the advantage of maximum rigidity is realized by the same expedient of having the grain run from end to end of the blank which results in the grain running circumferentially of the vertical cross section of the package. Regardless of the exact shape and character of the finished package, the important thing is the formation of the blank with the grain running from end to end, and the use of the blank in forming the package so that the grain supports the package vertically and transversely. By the term "end" is meant the opposite edges where the plural layers lie coincident, regardless of whether the blank is long or short and regardless of the relative measurement from side to side, the term "side" meaning the opposite edges where the light sheet extends beyond the margin of the heavy sheet.

This is an application for reissue of my Patent No. 2,335,019, granted November 23, 1943, upon an application which was a continuation in part of my then copending application Serial No. 403,351, filed July 21, 1941.

Having described my invention, what I claim as new and desire to secure by Letters Patent is:

1. Packaging means comprising a laminated blank formed with at least one relatively heavy paper sheet and at least one relatively light sheet of cellulose material, such blank being treated with a moisture proof adhesive substance which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines and their ends coinciding, the laminated central portion of the blank being relatively stiff, and the blank folded along the fold lines so that the central laminated portion constitutes a relatively strong and rigid body part having a rectangular cross section about the top, bottom and sides of the product packaged, and the marginally extending portions of the light sheet only folded to close the ends of the package, and the overlapping folds sealed to make the package substantially impervious to air, moisture, and other deleterious influences which might affect the contents.

2. Packaging means comprising a laminated blank formed with at least one relatively heavy paper sheet and at least one relatively light paper sheet, such blank being treated with wax which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines and their ends coinciding, the laminated central portion of the blank being relatively stiff, and the blank folded along the fold lines so that the central laminated portion constitutes a relatively strong and rigid body part about the top, bottom and sides of the product packaged, and the marginally extending portions of the light sheet only folded to close the ends of the package, and the overlapping folds heat sealed to make the package substantially impervious to air, moisture, and other deleterious influences which might affect the contents.

3. Packaging means comprising a laminated blank formed with at least one relatively heavy paper sheet and at least one relatively light sheet of cellulose material, such blank being treated with a moisture proof adhesive substance which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines and their ends coinciding, the laminated central portion of the blank being relatively stiff, and the blank being folded along the fold lines so that the central laminated portion constitutes a relatively strong and rigid body part having a rectangular cross section about the top, bottom and sides of the product packaged, and the marginally extending portions of the light sheet only folded to close the ends of the package with substantially none of the light sheet extending beyond the ends of the heavy sheet.

4. Packaging means comprising a laminated blank formed with at least one relatively heavy paper sheet and at least one relatively light sheet of cellulose material, both sheets of such blank being impregnated with a moisture proof, adhesive substance which secures the heavy sheet throughout its area to the light sheet, coats the surfaces of the blank, and renders the blank substantially impervious to air and moisture and resistant to grease, spaced parallel fold lines extending transversely of the laminated central portion of the blank providing rectangular areas defined by the fold lines and the side edges of said heavy sheet for label printing having a predetermined fixed position on the finished package, the heavy sheet being of less width than the light sheet but of the same length, the sheets being positioned with their medial longitudinal lines and their ends coinciding, the laminated central portion of the blank being relatively stiff, and the blank being folded along the fold lines so that the central laminated portion constitutes a relatively strong and rigid body part having a rectangular cross section about the top, bottom and sides of the product packaged, and the marginally extending portions of the light sheet only folded to close the ends of the package.

5. Packaging means comprising a laminated blank formed with at least one relatively heavy paper sheet and at least one relatively light sheet of cellulose material, such blank being treated with a moisture proof adhesive substance which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines and their ends coinciding, the laminated central portion of the blank being relatively stiff, and the blank being folded along the fold lines so that the central laminated portion constitutes a relatively strong and rigid body part having a rectangular cross section about the top, bottom and sides of the product packaged, and the marginally extending portions of the light sheet only folded inwardly from the side edges of said heavy sheet and covering the end portions of said product to close the ends of the package with substantially none of the light sheet extending beyond the ends of the heavy sheet.

6. Packaging means comprising a laminated blank formed with at least one relatively heavy paper sheet and at least one relatively light sheet of cellulose material, both sheets of such blank being impregnated with a moisture proof adhesive substance which secures the heavy sheet throughout its area to the light sheet, coats the surfaces of the blank, and renders the blank substantially impervious to air and moisture and resistant to grease, spaced parallel fold lines extending transversely of the laminated central portion of the blank providing rectangular areas defined by the fold lines and the side edges of said heavy sheet for label printing having a predetermined fixed position on the finished package, the heavy sheet being of less width than the light sheet but of the same length, the sheets being positioned with their medial longitudinal lines and their ends coinciding, the laminated central portion of the blank being relatively stiff, and the blank being folded along the fold lines so that the central laminated portion constitutes a relatively strong and rigid body part having a rectangular cross section about the top, bottom and sides of the product packaged, and the marginally extending portions of the light sheet only folded inwardly from the side edges of said heavy sheet and covering the end portions of said product to close the ends of the package.

7. Packaging means comprising a laminated blank formed with at least one relatively heavy paper sheet and at least one relatively light sheet of cellulose material, such blank being treated with a moisture proof bonding substance which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines substantially coinciding and with their ends coincident, the laminated central portion of the blank being relatively stiff, and the blank being folded along the fold lines so that the central laminated portion defines a relatively strong and rigid body having plane surfaced side panels about the product packaged, and the marginally extending portions of the light sheet only folded to close the ends of the package with substantially none of the light sheet extending beyond the ends of the heavy sheet.

8. Packaging means comprising a laminated blank formed with at least one relatively heavy paper sheet and at least one relatively light sheet of cellulose material, such blank being treated with a moisture proof bonding substance which secures the heavy sheet throughout its area to the light sheet and renders the blank substantially impervious to air and moisture, spaced parallel fold lines extending transversely of the laminated central portion of the blank, the heavy sheet being of less width than the light sheet but of the same length, the sheets being positioned with their medial longitudinal lines substantially coinciding and with their ends coincident, the laminated central portion of the blank being relatively stiff, and the blank being folded along the fold lines so that the central laminated portion defines a relatively strong and rigid body about the product packaged, and the marginally extending portions of the light sheet only folded inwardly from the side edges of said heavy sheet in confronting relation with said heavy sheet for covering the end portion of said product and to close the ends of the package with substantially none of the light sheet extending beyond the ends of the heavy sheet.

9. Packaging means comprising a laminated substantially rectangular blank-roll in which each blank when cut from the roll is suitable for forming into a container having substantially plane surfaced panels, said blank formed with at least one relatively heavy sheet and at least one relatively light sheet, such blank possessing a moisture proofing and bonding substance at least on the surfaces thereof which secures the heavy sheet throughout its area to the light sheet and renders the blank substantially impervious to air and moisture, spaced parallel scored fold lines extending transversely of the laminated central portion of the blank to predetermine and fix the location of the longitudinal edge folds of the container, the heavy sheet being of less width than the light sheet, but of the same length, and the sheets being positioned with the heavy sheet intermediate the longitudinal sides of the light sheet so that the heavy sheet is spaced inwardly from the side edges of the light sheet and with the ends of the two sheets coinciding, the laminated central portion of the blank being relatively stiff, and the marginally extending portions of the light sheet being relatively soft and pliable and adapted to be folded to form flat end closures for the container, said bonding substance also being adapted to subsequently serve as a seal and to retain the laminated and pliable portions in folded condition.

10. Packaging means comprising a laminated substantially rectangular blank suitable for forming into a container having substantially plane surfaced panels, said blank formed with at least one relatively heavy sheet of cellulose material and at least one relatively light sheet of cellulose material, such blank possessing a moisture proof coat of bonding substance which secures the heavy sheet throughout its area to the light sheet and renders the blank substantially impervious to air and moisture, spaced parallel scored fold lines extending transversely of the laminated central portion of the blank to predetermine and fix the location of the longitudinal edge folds of the container, the heavy sheet being of less width than the light sheet, but of the same length and the sheets being positioned with their ends coinciding and with their medial longitudinal lines substantially coinciding, the laminated central portions of the blank being relatively stiff, and the marginally extending portions of the light sheet being relatively soft and pliable, said bonding substance also being adapted to subsequently serve as a seal and to retain the laminated and pliable portions in folded condition.

11. Packaging means comprising a laminated blank formed with at least one relatively heavy paper sheet and at least one relatively light sheet of cellulose material, such blank being treated with a moisture proof adhesive substance which secures the heavy sheet throughout its area to the light sheet and renders the blank substantially impervious to air and moisture, spaced parallel fold lines extending transversely of the laminated central portion of the blank, the heavy sheet being of a width corresponding to one dimension of the finished package but being of less width than the light sheet but of the same length, the sheets being positioned with their medial longitudinal lines and ends coinciding, the laminated central portion of the blanks being relatively stiff and having a width corresponding to one dimension of the finished package.

12. Packaging means comprising a laminated substantially rectangular blank suitable for forming into a container having substantially plane surfaced panels, said blank formed with at least one relatively heavy sheet of cellulose material and at least one relatively light sheet of cellulose material, such blank possessing a moisture proofing and bonding substance at least on the surfaces thereof which secures the heavy sheet throughout its area to the light sheet and renders the blank substantially impervious to air and moisture, spaced parallel scored fold lines extending transversely of the laminated central portion of the blank to predetermine and fix the location of the longitudinal edge folds of the container, the heavy sheet being of less width than the light sheet, but of the same length and the sheets being positioned with their ends coinciding and with the sides of the heavy sheet spaced inwardly from the sides of the light sheet, the laminated central portion of the blank being relatively stiff, and the marginally extending portions of the light sheet being relatively soft and pliable, said bonding substance also being adapted to subsequently serve as a seal and to retain the laminated and pliable portions in folded condition.

CHARLES D. MULLINIX.

REFERENCES CITED

The following references are of record in the file of this patent:

UNITED STATES PATENTS

| Number | Name | Date |
|---|---|---|
| 1,135,878 | Christensen | Apr. 13, 1915 |
| 1,421,027 | Reynolds | June 27, 1922 |
| 1,474,088 | Reynolds | Nov. 13, 1923 |
| 2,099,301 | Hamersley et al. | Nov. 16, 1937 |
| 2,106,499 | Francisco | Jan. 25, 1938 |
| 2,115,318 | Rosen | Apr. 26, 1938 |
| 2,155,668 | Little | Apr. 25, 1939 |
| 2,171,775 | Wilshire | Sept. 5, 1939 |
| 2,189,347 | Martin | Feb. 6, 1940 |
| 2,353,178 | Moore | July 11, 1944 |

FOREIGN PATENTS

| Number | Country | Date |
|---|---|---|
| 704,370 | France | Feb. 23, 1939 |